(12) United States Patent
Thomas

(10) Patent No.: US 8,763,485 B2
(45) Date of Patent: Jul. 1, 2014

(54) MULTI-SPEED TRANSMISSION

(75) Inventor: Steven G. Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 13/307,037

(22) Filed: Nov. 30, 2011

(65) Prior Publication Data

US 2013/0133478 A1    May 30, 2013

(51) Int. Cl.
*F16H 3/08* (2006.01)

(52) U.S. Cl.
USPC .......................................................... 74/330

(58) Field of Classification Search
USPC ........................................... 74/330, 331, 333
See application file for complete search history.

(56) References Cited

U.S. PATENT DOCUMENTS

| 4,584,891 | A | 4/1986 | Mori |
| 5,044,215 | A | 9/1991 | Watanabe |
| 5,390,560 | A | 2/1995 | Ordo |
| 7,171,867 | B2 | 2/2007 | McCrary et al. |
| 7,246,536 | B2 | 7/2007 | Baldwin |
| 8,166,842 | B2 * | 5/2012 | Rieger ............................ 74/330 |
| 8,365,624 | B2 * | 2/2013 | Gumpoltsberger et al. .... 74/330 |
| 8,365,625 | B2 * | 2/2013 | Rieger et al. .................... 74/330 |
| 8,365,626 | B2 * | 2/2013 | Rieger et al. .................... 74/330 |
| 2007/0149344 | A1 | 6/2007 | McGrath et al. |

\* cited by examiner

*Primary Examiner* — Ha D Ho
(74) *Attorney, Agent, or Firm* — James Dottavio; MacMillan, Sobanski & Todd, LLC

(57) ABSTRACT

A vehicle transmission includes first, second, third and fourth meshing gear-pinion pairs. The transmission produces a first speed ratio through a power path that includes first and second input shafts, a gear coupler and the first, second and third gear-pinion pairs. The transmission also produces a second speed ratio through a power path that includes the second input shaft, the gear coupler and the second, third and fourth gear-pinion pairs.

11 Claims, 2 Drawing Sheets

| Span: | 7.69 |
|---|---|
| Gear | Ratios: |
| 1 | 20.00 |
| 2 | 16.00 |
| 3 | 10.32 |
| 4 | 6.88 |
| 5 | 5.08 |
| 6 | 4.06 |
| 7 | 3.25 |
| 8 | 2.60 |

MULTI-SPEED TRANSMISSION

BACKGROUND OF THE INVENTION

1. Field of the Invention

This invention relates generally to a transmission for a motor vehicle, particular for use in a dual input clutch transmission.

2. Description of the Prior Art

A dual clutch transmission (DCT), also called a powershift transmission, is a geared mechanism employing two input clutches used to produce multiple gear ratios in forward drive and reverse drive. It transmits power continuously using synchronized clutch-to-clutch shifts.

The transmission incorporates gearing arranged in a dual layshaft configuration between the transmission input and its output. One input clutch transmits torque between the input and a first layshaft associated with certain gears; the other input clutch transmits torque between the transmission input and a second layshaft associated with the other gears. The transmission produces gear ratio changes by alternately engaging a first input clutch and running in a current gear, disengaging the second input clutch, preparing a power path in the transmission for operation in the target gear, disengaging the first clutch, engaging the second clutch and preparing another power path in the transmission for operation in the next gear.

A powershift transmission launches the vehicle from a stopped or nearly stopped condition using a start clutch. Due to engine downsizing and boosting with turbo charging for a given vehicle size, boost is not present at launch causing potentially insufficient transmission gear ratio for launching.

A powershift transmission generally has a specific number of gears and provides little design flexibility for accommodating an increase in the number of gears to five, six or seven speeds.

A powershift transmission generally requires a launch clutch to accelerate a vehicle from a stopped or nearly stopped condition due to the lack of engine torque amplification that a torque converter would provide.

SUMMARY OF THE INVENTION

A vehicle transmission includes first, second, third and fourth meshing gear-pinion pairs. The transmission produces a first speed ratio through a power path that includes first and second input shafts, a gear coupler and the first, second and third gear-pinion pairs. The transmission also produces a second speed ratio through a power path that includes the second input shaft, the gear coupler and the second, third and fourth gear-pinion pairs.

The invention includes a method for operating the transmission by transmitting power through an input clutch to a gear of a first gear-pinion pair, using a gear-coupler to connect gears of the first gear-pinion pair and a second gear-pinion pair, transmitting power from the pinion of the second gear-pinion pair to the pinion of a third gear-pinion pair, and transmitting power from the pinion of a third gear-pinion pair to the gear of a third gear-pinion pair.

The first and eighth speed ratios gears are produced by coupling sixth speed gear to the fifth speed gear using a gear-coupler that is journalled on a layshaft, thereby minimizing the number of gears and pinions required to produce eight forward speed ratios.

The gearbox preferably produces eight forward speeds and reverses drive, but it can be converted easily to produce six or seven forward speeds and reverse drive.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
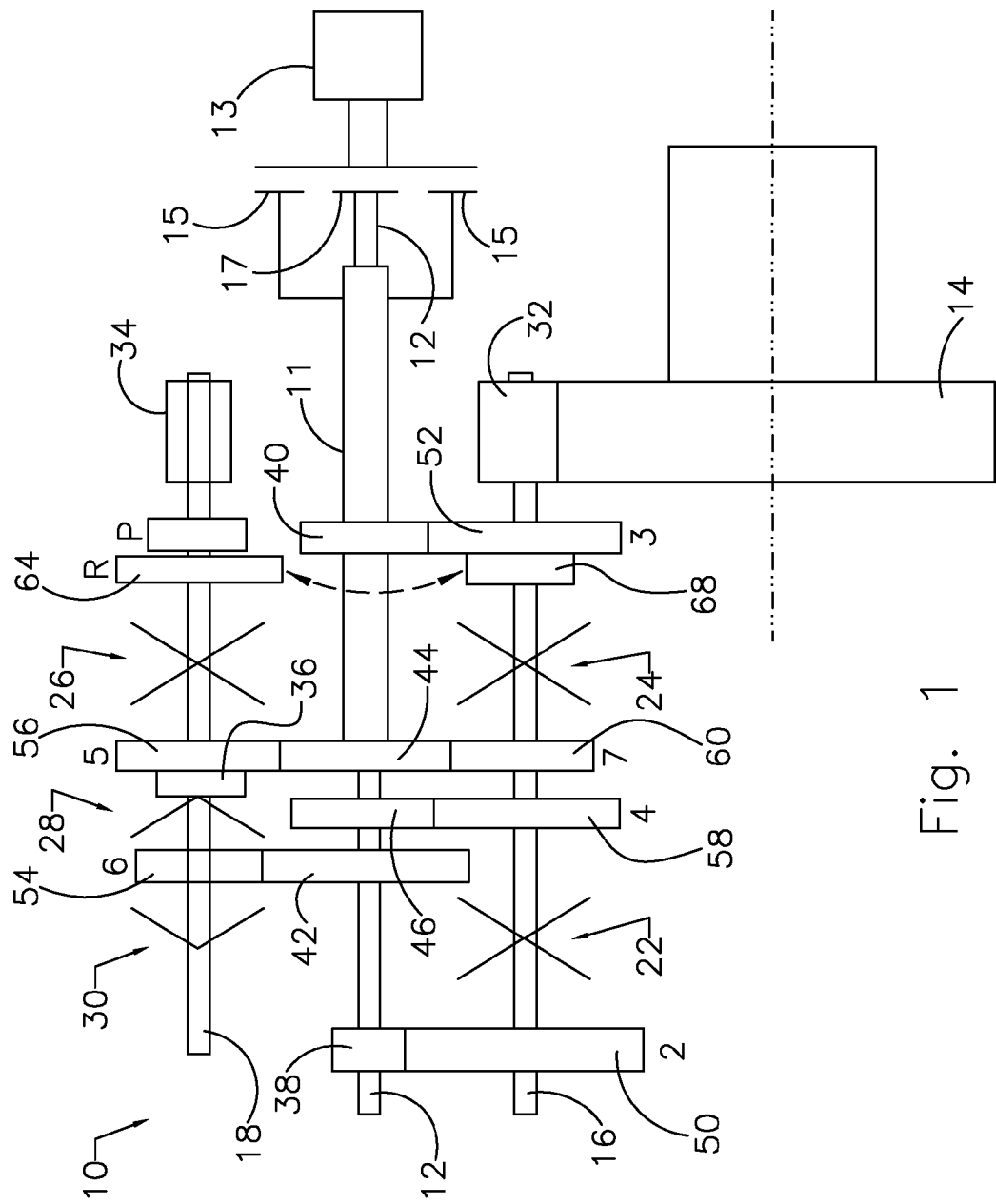
FIG. 1 is a schematic diagram of transmission gearing that produces eight forward speed and reverse drive.

Referring now to FIG. 1, a powershift transmission 10 includes first and second coaxial input shafts 11, 12, an output gear 14 driveably connected to the vehicle wheels (not shown); first and second layshafts 16, 18, respectively; a 2-4 synchronizer 22; a 7-3 synchronizer 24; a 5-R synchronizer 26; a gear-coupler half synchronizer 28; and a sixth gear half synchronizer 30. The hollow input shaft 11 is driveably connected to the crankshaft of an engine 13 through an input clutch 15. The inner shaft 12 is driveably connected to the crankshaft of engine 13 through an input clutch 17. Input clutches 15, 17 include sets of clutch plates, which alternately engage and disengage mutually Layshaft 16 includes an output pinion 32, secured to layshaft 16 and meshing with output gear 14. Layshaft 18 includes an output pinion 34, secured to layshaft 18 and meshing with output gear 14. Each of synchronizers 22, 24, 30 is secured to the layshaft on which it is supported and includes a selector sleeve having a neutral position, from which the sleeve is moved axially along the respective layshaft to secure a gear to the layshaft.

The gear-coupler half synchronizer 28, however, is not secured for rotation to a halfshaft. Instead gear-coupler synchronizer 28 is supported on a gear coupler 36, which is secured to the fifth gear 56 or sixth gear 54. Fifth gear 56 and sixth gear 54 are journalled on layshaft 18 and rotate independently of the speed of layshaft 18. The gear-coupler half synchronizer 28 includes a selector sleeve having a neutral position, from which the sleeve is moved axially along layshaft 18 to driveably connect the fifth gear 56 and sixth gear 54 mutually.

Secured to input shaft 12 are input pinions 38, 42, 46. Secured to input shaft 11 are input pinions 40, 44. Second gear 50 meshes with pinion 38 and is journalled on layshaft 16. Third gear 52 meshes with pinion 40 and is journalled on layshaft 16. Sixth gear 54 meshes with pinion 42 and is journalled on layshaft 18. Fifth gear 56 meshes with pinion 44 and is journalled on layshaft 18. Fourth gear 58 meshes with pinion 46 and is journalled on layshaft 16. Seventh gear 60 meshes with pinion 44 and is journalled on layshaft 16. Reverse gear 64 meshes with idler gear 68 and is journalled on layshaft 18. Idler gear 68 is driveably connected to third gear 52. Idler gear 68 and third gear 52 are journalled on layshaft 16 for rotation as a unit.

During operation in a positive torque direction, i.e., when power is transmitted from the engine to the output 14, each of the gear ratios is produced by transmitting power from the engine 13, through one of the input clutch 15, 17, to the input shaft 11, 12 that corresponds to the desired gear. First gear is produced when input clutch 15 is engaged, input clutch 17 is disengaged, the sector sleeve of synchronizer 22 is moved leftward into engagement with second gear 50, the selector sleeve of the gear-coupler synchronizer 28 is actuated to interconnect fifth gear 56 and sixth gear 54, and the selector sleeve of the other synchronizers is in the neutral position. The power path through the transmission in first gear includes input clutch 15, input shaft 11, pinion 44, fifth gear 56, synchronizer 28, sixth gear 54, pinion 42, input shaft 12, pinion 38, second gear 50, synchronizer 22, layshaft 16, output pinion 32 and output gear 14. The first gear speed ratio is the product of the fifth gear speed ratio and the second gear speed ratio, divided by the sixth gear speed ratio, i.e., $[1^{st}=(5^{th}\times 2^{nd})/6^{th}]$.

Second gear is produced when input clutch 15 is disengaged, input clutch 17 is engaged, the sector sleeve of synchronizer 22 is moved leftward into engagement with second gear 50, and the selector sleeve of the other synchronizers is in the neutral position. The power path for second gear includes input clutch 17, input shaft 12, pinion 38, second gear 50, synchronizer 22, layshaft 16, output pinion 32 and output gear 14.

Third gear is produced when input clutch 15 is engaged, input clutch 17 is disengaged, the sector sleeve of synchronizer 24 is moved rightward into engagement with third gear 52, and the selector sleeve of the other synchronizers is in the neutral position. The power path for third gear includes input clutch 15, input shaft 11, pinion 40, third gear 52, synchronizer 24, layshaft 16, output pinion 32 and output gear 14.

Fourth gear is produced when input clutch 15 is disengaged, input clutch 17 is engaged, the sector sleeve of synchronizer 22 is moved rightward into engagement with fourth gear 58, and the selector sleeve of the other synchronizers is in the neutral position. The power path for fourth gear includes input clutch 17, input shaft 12, pinion 46, fourth gear 58, synchronizer 22, layshaft 16, output pinion 32 and output gear 14.

Fifth gear is produced when input clutch 15 is engaged, input clutch 17 is disengaged, the sector sleeve of synchronizer 26 is moved leftward into engagement with fifth gear 56, and the selector sleeve of the other synchronizers is in the neutral position. The power path for fifth gear includes input clutch 15, input shaft 11, pinion 44, fifth gear 56, synchronizer 26, layshaft 18, output pinion 34 and output gear 14.

Sixth gear is produced when input clutch 15 is disengaged, input clutch 17 is engaged, the sector sleeve of synchronizer 30 is moved leftward into engagement with sixth gear 54, and the selector sleeve of the other synchronizers is in the neutral position. The power path for sixth gear includes input clutch 17, input shaft 12, pinion 42, sixth gear 54, synchronizer 30, layshaft 18, output pinion 34 and output gear 14.

Seventh gear is produced when input clutch 15 is engaged, input clutch 17 is disengaged, the sector sleeve of synchronizer 24 is moved leftward into engagement with seventh gear 60, and the selector sleeve of the other synchronizers is in the neutral position. The power path for seventh gear includes input clutch 15, input shaft 11, pinion 44, seventh gear 60, synchronizer 24, layshaft 16, output pinion 32 and output gear 14.

Eighth gear is produced when input clutch 15 is disengaged, input clutch 17 is engaged, the sector sleeve of synchronizer 24 is moved leftward into engagement with seventh gear 60, the selector sleeve of the gear-coupler synchronizer 28 is actuated to interconnect fifth gear 56 and sixth gear 54, and the selector sleeve of the other synchronizers is in the neutral position. The power path through the transmission in eighth gear includes input clutch 17, input shaft 12, pinion 42, sixth gear 54, synchronizer 28, fifth gear 56, pinion 44, seventh gear 60, synchronizer 24, layshaft 16, output pinion 32 and output gear 14. The eighth gear speed ratio is the product of the sixth gear speed ratio and the seventh gear speed ratio, divided by the fifth gear speed ratio, i.e., $[8^{st}=(6^{th}\times 7^{th})/5^{th}]$.

Reverse gear is produced when input clutch 15 is engaged, input clutch 17 is disengaged, the selector sleeve of synchronizer 26 is moved rightward into engagement with reverse gear 64, and the selector sleeve of the other synchronizers is in the neutral position. The reverse gear power path through transmission 10 includes input shaft 11, pinion 40, third gear 52, idler 68, reverse gear 64, synchronizer 28, layshaft 18, output pinion 34 and output gear 14.

Figures 2, 3:
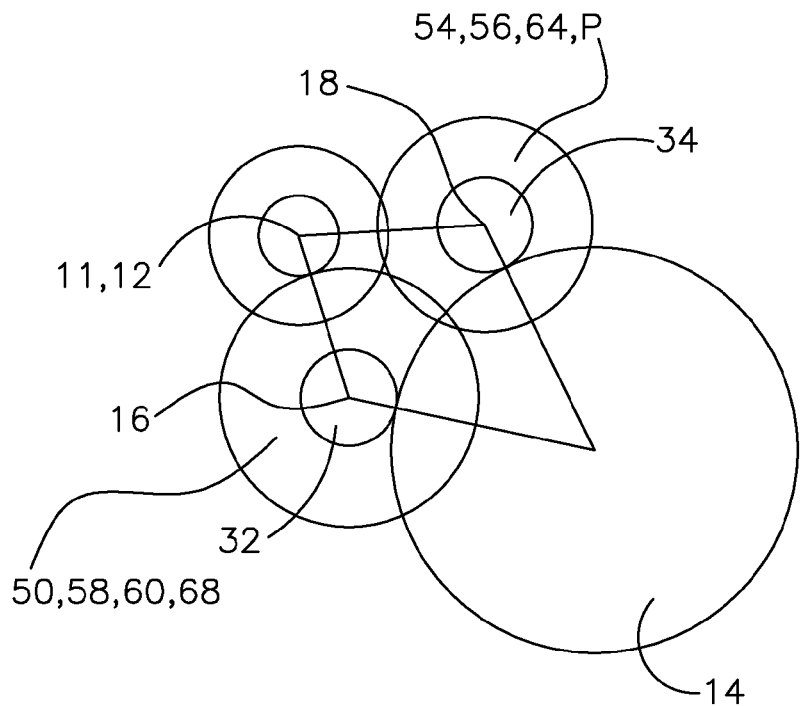
FIG. 2 is a schematic diagram showing an end view of the gearing of FIG. 1.
FIG. 3 is a table showing preferred speed ratios for each of the eight forward speeds of the transmission of FIG. 1.

FIG. 3 shows preferred speed ratios for the eight forward gears and the span.

Although the transmission has been described with reference to synchronizers 22, 24, 26, 28, 30, the synchronizers can be replaced by clutch couplers for connecting a layshaft to the gear selected for engagement to the respective layshaft.

In accordance with the provisions of the patent statutes, the preferred embodiment has been described. However, it should be noted that the alternate embodiments can be practiced otherwise than as specifically illustrated and described.

The invention claimed is:

1. A vehicle transmission, comprising:
   first, second, third and fourth gear-pinion pairs, the transmission producing a first speed ratio through a power path that includes first and second input shafts, a gear coupler and the first, second and third gear-pinion pairs, and a second speed ratio through a power path that includes the second input shaft, the gear coupler and the second, third and fourth gear-pinion pairs.

2. The transmission of claim 1, further comprising:
   a layshaft supporting gears of the second and third gear-pinion pairs journalled on the layshaft;
   the gear coupler being journalled on the layshaft for driveably connecting gears of the second and third gear-pinion pairs.

3. The transmission of claim 1, further comprising:
   a second layshaft supporting gears of the first and fourth gear-pinion pairs, the second input shaft supporting pinions of the first and third gear-pinion pairs.

4. The transmission of claim 1, wherein the first input shaft supports a pinion that meshes with the gear of the second gear-pinion pair and the gear of the fourth gear-pinion pair.

5. The transmission of claim 1, further comprising:
   a second layshaft supporting gears of the first and fourth gear-pinion pairs; and
   a second coupler for driveably connecting the gear of the first gear-pinion pair to the second layshaft.

6. The transmission of claim 1, further comprising:
   a second layshaft supporting gears of the first and fourth gear-pinion pairs; and
   a third coupler for driveably connecting the gear of the fourth gear-pinion pair to the second layshaft.

7. A vehicle transmission, comprising:
   a first input shaft supporting pinions of third, fifth and seventh speed ratios;
   a second input shaft supporting pinions of second, fourth and sixth speed ratios;
   a first layshaft supporting gears of the fifth and sixth speed ratios;

a second layshaft supporting gears of the second, third, fourth and seventh speed ratios;

a gear-coupler for driveably connecting the gears of the fifth and sixth speed ratios.

8. The transmission of claim 7, further comprising:
an idler gear secured to the gear of the third speed ratio;
a reverse gear journalled on the first layshaft and meshing with the gear of the third speed ratio; and
a first coupler for alternately driveably connecting the reverse gear and the gear of the fifth speed ratio to the first layshaft.

9. The transmission of claim 7, further comprising:
a second coupler for driveably connecting the gear of the sixth speed ratio to the first layshaft.

10. The transmission of claim 7, further comprising:
an idler gear secured to the gear of the third speed ratio;
a third coupler for alternately driveably connecting the idler gear and the gear of the seventh speed ratio to the second layshaft.

11. The transmission of claim 7, further comprising:
a fourth coupler for alternately driveably connecting the gear of the second speed ratio and the gear of the fourth speed ratio to the second layshaft.

* * * * *